United States Patent
Brode et al.

(10) Patent No.: US 9,243,964 B2
(45) Date of Patent: Jan. 26, 2016

(54) DEVICE FOR CONVERTING A FORCE OR A PRESSURE INTO AN ELECTRICAL SIGNAL AND METHOD FOR PRODUCING SUCH A DEVICE

(75) Inventors: Wolfgang Brode, Hermsdorf (DE); André Keiner, Jahnsdorf (DE)

(73) Assignee: HYDAC ELECTRONIC GMBH, Saarbruecken (DE)

( * ) Notice: Subject to any disclaimer, the term of this patent is extended or adjusted under 35 U.S.C. 154(b) by 6 days.

(21) Appl. No.: 13/261,689

(22) PCT Filed: Jan. 11, 2012

(86) PCT No.: PCT/EP2012/000094
§ 371 (c)(1),
(2), (4) Date: Jul. 31, 2013

(87) PCT Pub. No.: WO2012/095304
PCT Pub. Date: Jul. 19, 2012

(65) Prior Publication Data
US 2013/0305834 A1    Nov. 21, 2013

(30) Foreign Application Priority Data
Jan. 12, 2011   (DE) .......................... 10 2011 008 346

(51) Int. Cl.
*G01L 1/00* (2006.01)
*G01L 1/18* (2006.01)
*G01L 1/22* (2006.01)
*G01L 9/00* (2006.01)

(52) U.S. Cl.
CPC ................. *G01L 1/18* (2013.01); *G01L 1/2231* (2013.01); *G01L 9/006* (2013.01); *Y10T 29/49002* (2015.01)

(58) Field of Classification Search
CPC ......... G01L 1/2231; G01L 1/18; G01L 9/006; G01L 19/00; G01L 27/005; G01L 1/22; G01L 23/222; G01L 23/10; G01L 1/20; G01L 9/0055; G01L 9/0073; G01L 9/0075; G01L 13/025; Y10T 29/49002; G05D 16/208; G01G 3/00; G01G 3/14
USPC ............. 73/778, 862.382, 715, 700, 862.381; 338/5
See application file for complete search history.

(56) References Cited

U.S. PATENT DOCUMENTS

| 3,754,438 A | 8/1973 | Matson |
| 5,513,534 A * | 5/1996 | Brechbuhl et al. ............... 73/715 |
| 6,655,216 B1 | 12/2003 | Aizawa |

FOREIGN PATENT DOCUMENTS

| DE | 34 19 418 A1 | 12/1984 |
| DE | 89 01 100 U1 | 2/1989 |

(Continued)

*Primary Examiner* — Harshad R Patel
*Assistant Examiner* — Brandi N Hopkins
(74) *Attorney, Agent, or Firm* — Wenderoth, Lind & Ponack, L.L.P.

(57) ABSTRACT

A device (1) converts a force or a pressure into an electrical signal and has a first deformation element (10), in particular a first membrane (12), to apply the force or the pressure to the device (1) and a second deformation element (20), in particular a second membrane (22), to convert the deflection of the force or the pressure into an electrical signal. The first deformation element (10) has a first force transmitter (14), and the second deformation element (20) has a second force transmitter (24) for transmitting the force from the first deformation element (10) to the second deformation element (20). The first force transmitter (14) is rigidly connected at its end distant from the first deformation element (10) to the end of the second force transmitter (24) distant from the second deformation element (20). Both compressive forces and tensile force can be transmitted from the first deformation element (10) to the second deformation element (20) by the first and second force transmitters (14, 24). A method produces that device.

6 Claims, 2 Drawing Sheets

(56) References Cited

FOREIGN PATENT DOCUMENTS

| DE | 37 36 154 A1 | 5/1989 |
|----|---|---|
| DE | 101 31 688 A1 | 7/2002 |
| DE | 10 2007 027 274 A1 | 12/2008 |
| EP | 0 942 272 A2 | 9/1999 |
| WO | WO 2008151972 A3 * | 2/2009 |

* cited by examiner

DEVICE FOR CONVERTING A FORCE OR A PRESSURE INTO AN ELECTRICAL SIGNAL AND METHOD FOR PRODUCING SUCH A DEVICE

FIELD OF THE INVENTION

The invention relates to a device for converting a force or a pressure into an electrical signal and a method for producing such a device.

BACKGROUND OF THE INVENTION

Devices of this kind are typically based on the fact that the force and/or pressure causes a deformation of a deformation element intended for this purpose. That deformation is converted into an electrical signal. For example, a cantilever beam can be provided for a measurement of pure force, while a membrane is provided for a measurement of pressure.

For certain applications, particularly in the fields of processing and food engineering, a flush-mounted sensor is advantageous, where no medium is able to collect in the otherwise customary connection channel to the deformation element of the apparatus. With such sensors, the deformation of a flush-mounted deformation element, for example a flush-mounted membrane, is usually forwarded by a non-compressible transmission medium, for example oil, to the actual pressure sensing structure with strain gauges. From a production engineering perspective, these kinds of sensors are quite complex with regard to the required oil filling step, and they suffer from further disadvantages, for example, the undesired influence of the expansion of the transfer medium on the sensor signal in the event of a temperature increase.

SUMMARY OF THE INVENTION

An object of the present invention to provide an improved device that remedies the disadvantages of the prior art and ensures, in particular, reliable operation and a high level of measurement precision. Another object of the invention is to provide an improved method for producing such device that generates reproducibly robust, yet very precise devices, in simple process steps.

This object is basically achieved by a device including a first deformation element without any sensor elements connected to a second deformation element having at least one sensor element. The first deformation element is deformable by the impact of the force or the pressure that is to be measured. The deformation is preferably exclusively elastic. The deformation of the first deformation element is transmitted by a force transmission element to the second deformation element. The deformation of the second deformation element is converted into an electrical signal, for example by using strain gauges. Each deformation element constitutes one section of the force transmitter, respectively. In the course of the production of the device, these sections are rigidly connected to each other, either directly or indirectly, for example by using an intermediate piece.

For example, a pot-shaped, first deformation element is typically provided without sensor elements for the contact with the medium where pressure is to be detected. The first deformation element forms a membrane with a thickness that is adjusted to the nominal pressure of the device and that has a sufficiently high overload strength. The first deformation element can be produced as a turned part. During the turning process, for example, a tappet can be preserved in a central position as a force transmitter. The bending action of the first deformation element, consequent to the application of a pressure or a force, can be transmitted to the second deformation element.

The second deformation element can be a cantilever beam, or it can have a membrane and also be substantially configured, for example, as pot-shaped. The second deformation element can also include a tappet as a second force transmitter formed, for example, in one piece with the membrane. By the connection of the two free ends of the tappets to each other, a transmission of the compressive forces as well as tensile forces is possible from the first deformation element to the second deformation element. The connection of the two force transmitters can be achieved, for example, by welding, gluing, glass soldering, metallic soldering, eutectic alloying, or the like. By using an adhesive with a filler material of defined grain size, a defined adhesive gap can be ensured.

In one embodied example, both deformation elements include a membrane, and they can both be configured as pot-shaped. The force transmitter can be cylindrical in sections and/or formed in one piece with the respective membrane. The free end of the force transmitter can be flush with the edge of the membrane. In this case, the second deformation element is without deflection, unless it is not subjected to a force or pressure application, and can, depending on the stress that is acting on the first deformation element (tensile or compressive force, negative or positive pressure), be deflected in both directions, while providing a high level of linearity in the relationship between deflection and application of force or pressure.

In the alternative, the connection between the two deformation elements can also be achieved in that, already without the impact of a force or a pressure, particularly the second deformation element exhibits a preload, particularly a preload against the deflection of the second deformation element, as is occurring when a force or a pressure is in effect. This arrangement is especially advantageous if only tensile or compressive forces must be transferred during operation. In this case, a suitable preload helps to fully utilize the total highly linear range of the relationship between force or pressure and deflection of the deformation element, namely from −100% to +100% of the nominal deflection, not only from 0 to 100%. This preload can be provided, for example, by the use of a part inserted, between the two free ends of the two force transmitters, by the use of a part inserted between the edge regions of the two deformation elements that must be connected to each other, or by an adjusted length of at least one force transmitter.

The force transmitters are preferably disposed in the center of the deformation element, thereby simplifying, in particular, the production of the deformation elements as a turned part. The force transmitters are preferably formed in one piece with the membranes or cantilever beams.

In one embodied example, the first deformation element has a higher resistance to deflection than the second deformation element. For example, the membrane of the first deformation element can have a larger thickness and/or smaller lateral dimensions than the membrane of the second deformation element. The first deformation element, with the high resistance to deflection thereof, thus provides the overload strength of the apparatus.

The second deformation element is adjusted with regard to the resistance to deflection thereof to the desired measuring range of the device. Advantageously, one and the same first deformation element can be used for different measuring ranges, and the first deformation element is merely connected to varying second deformation elements to provide devices that are usable for different nominal ranges. The same second deformation element can be combined correspondingly, vice versa, with varying first deformation elements.

In one embodied example, the first deformation element that comes into contact with the medium where the pressure is to be measured and that is made of a suitable material, for example stainless steel, titanium or ceramics. In contrast, the second deformation element can be produced of a material that is commonly used for sensor elements, for example steel of specification 1.45.42 and that can be readily worked with regard to mounting sensor elements.

In one embodied example, sensor elements are disposed on a surface of the second deformation element that is directed away from the first deformation element, for example piezoresistive film resistors. The sensor elements can be configured as strain gauges. The sensor elements can be manufactured using thick film technology or thin film technology. The sensor elements can also be provided by applying, particularly an adhesively applied, strain gauge film.

In one embodied example, the second deformation element is formed as a membrane or as a cantilever beam. The membrane or the cantilever beam can have, preferably formed centrally and in one piece therewith, a tappet that protrudes in the direction of the first deformation element and that constitutes the second force transmitter.

In one embodied example, the device preferably includes an annular step on the exterior of the first and/or second deformation element, by which the apparatus can be fixed in place in a pre-definable position inside a housing. The step can be configured, for example, as an annular shoulder. A step that is disposed on the first deformation element can serve to provide a flush-mounted and flat arrangement of the device inside a housing. A step that is disposed on the second deformation element can serve as a contact stop for a fastener by which the device can be fitted inside a housing.

The invention also relates to a method for producing a device as described above. In one embodied example, the two force transmitters are initially rigidly connected to each other, and the two deformation elements are first connected to each other, preferably by their edges, subsequently. If the force transmitters as well as the edges are welded together, the two force transmitters can be connected to each other by resistance welding, while the edges of the two deformation elements are electrically insulated from each other, for example, in that, prior to connecting the two force transmitters to each other, an electrically insulating layer is applied to at least one of the two deformation elements. Alternately, the insertion of thin insulation bodies, annular mica discs, for example, is also possible.

After the two force transmitters have been connected to each other, the edges of the two deformation elements are welded together, preferably in a vacuum or under a protective gas atmosphere, for example by electron beam welding or laser welding. Any insulation layer applied in the edge region can first be removed, for example utilizing wet-chemicals. Welding the edges occurs, preferably, on the exterior of the deformation element. If both deformation elements are formed as pot-shaped membranes, the circumferential weld seam is able to provide a vacuum-tight connection. If a vacuum-tight connection is not necessary, point-type or line-type welding is possible as well to create the connection. The depth of the weld seam therein is preferably less than 80%, particularly less than 50%, of the width of the edge to reduce the influence of any mechanical stresses that are induced by the welding step.

In one embodied example, at least one of the deformation elements includes, in the area of the weld seam, a flange-type widening. The depth of the weld seam is less than 200% of the radial extension of the flange, preferably less than 150%, and particularly less than 120%. The mechanical stresses generated due to the welding then step extend essentially only in the area of the flange, thus not causing any distortion of the measured signal.

Other objects, advantages and salient features of the invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
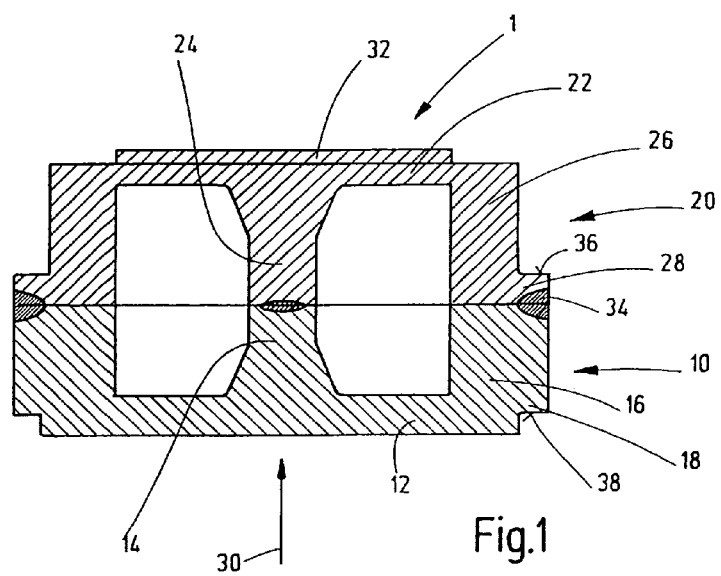
FIG. 1 is a side elevational view in section of the device according to a first exemplary embodiment of the invention.

FIG. 1 shows a cross-section of a first exemplary embodiment of a device 1 according to the invention that includes a first deformation element 10 forming in one piece a first membrane 12. The first deformation element 10 is substantially shaped as a pot in one piece with the membrane 12, a first force transmitter 14 and a circumferential edge 16. The first force transmitter 14 is centrally disposed in the area of the preferably circular first membrane 12, and it is at least in sections cylindrical. The first force transmitter 14 widens in a cone-shaped manner at the transition to the first membrane 12. The transition to the first membrane 12 can additionally be rounded.

The device 1 includes a second deformation element 20 formed in one piece with a second membrane 22, a second force transmitter 24 and an edge 26. The thickness of the second membrane 22 is less than the thickness of the first membrane 12. The second force transmitter 24 widens at the transition to the second membrane 22 in a cone-shaped fashion. The transition to the second membrane 22 is rounded.

The introduction of the force or pressure 30, respectively, to be measured occurs via the surface of the first membrane 12 that is directed away from the second deformation element 20. The two force transmitters 14, 24 are rigidly connected, particularly welded to each other, at the free ends thereof that are directed toward each other. This way, a deformation of the first membrane 12 is transmitted from the former by the two force transmitters 14, 24 to the second membrane 22, irrespective of whether these are pressure forces or tensile forces.

At least one sensor element 32 is applied on the surface of the second membrane 22 that is directed away from the first deformation element 10. Using this sensor element, a deformation of the second membrane 22 can be converted into an electrical signal. The sensor element 32 is, for example, a resistor that is sensitive to strain. Two sensor elements 32 can be electrically connected to form a half-bridge, or four sensor elements 32 can be connected to form a full-bridge. The utilization of other converter principles is possible as well, for example piezoelectric sensors or an optical detection of the deflection of the second membrane 22.

The two deformation elements 10, 20 are disposed contacting each other at the edges 16, 26 thereof. They are connected to each other on the exterior sides thereof, particularly welded together. The second deformation element 20 exhibits an outer flange 28 at its edge section directed toward the first deformation element 10. The connection seam 34, which can be a weld seam, for example, extends radially, essentially corresponding to the radial extension of the flange 28. This way, any mechanical stresses induced by the connection seam 34 are prevented from causing a deformation of the second membrane 22 that could compromise the measured result. Instead, the mechanical stresses are relieved in the area of the outer flange 28. In addition, the outer flange 28 forms an annular step 36 by which the device 1 can be fixed in place in a pre-definable position of a housing (FIG. 2).

In the area of the edge 16, the first deformation element 10 has a preferably annular outer flange 18 by which the device 1 can be fixed in a pre-definable position inside a housing. For example, the device 1 can be inserted in a correspondingly sized cutout in a housing, such that the surface of the first membrane 12 is flush with the front side of the housing (FIG. 2). Alternately or additionally, the outer flange 18 and/or the step 38 can be formed by the same to serve as a receptacle for a sealing means.

Figure 2:
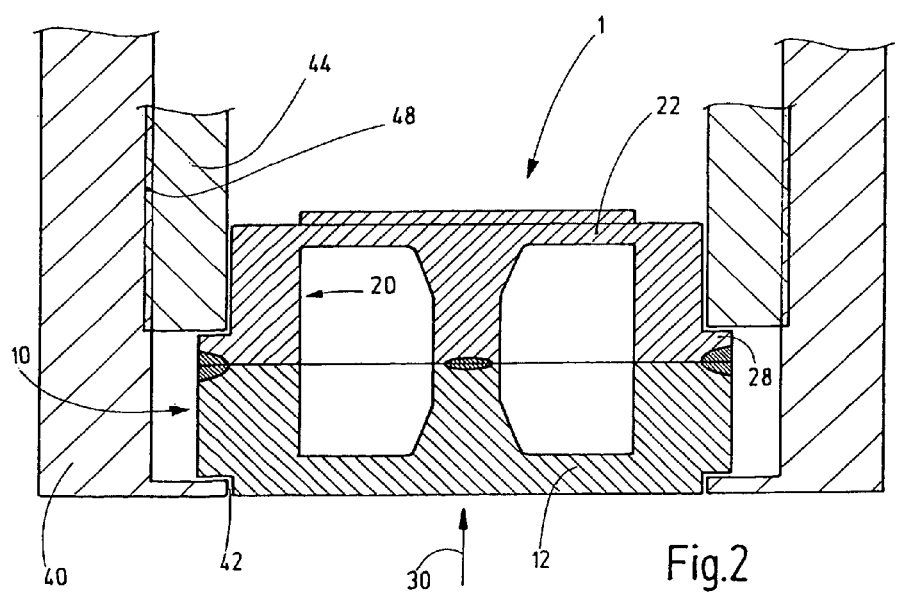
FIG. 2 is a side elevational view in section of the device of FIG. 1, installed inside a housing.

FIG. 2 shows a cross-section of the device 1 from FIG. 1 in an installed state inside a housing 40. On the front side of the housing, the housing 40 includes a recess 42 with an inside width that is smaller than the outside diameter of the first deformation element 10, but larger than the remaining outside diameter of the first membrane 12 in the front region with regard to the outer flange 18. The device 1 then can be inserted in the recess 42 and can come to lie flush with the front side of the housing 40. A fastener 44 is inserted into the housing 40 on the inside, for example a screw nut with an external thread 48 or a hollow screw bolt. The fastener is in contact by the front end thereof with the step 36 formed by the outer flange 28 of the second deformation element 20. This way, the device 1 can be detachably mounted in the depicted pre-definable position within the housing 40. A seal that may be necessary can be inserted, for example, between the step 38 of the first deformation element 10 and the housing 40, and/or between the fastener 44 and the step 36 of the second deformation element 20.

Figure 3:
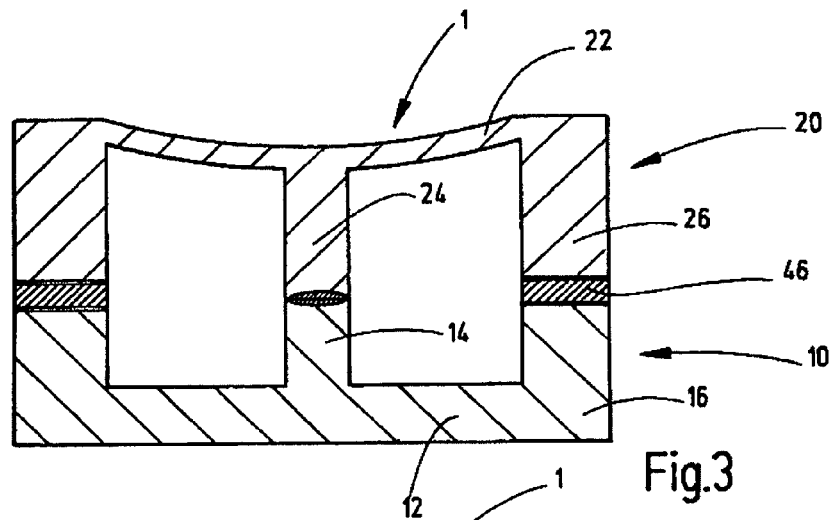
FIGS. 3 and 4 are side elevational views in section showing two different production states of a device according to the invention.
Figure 4:
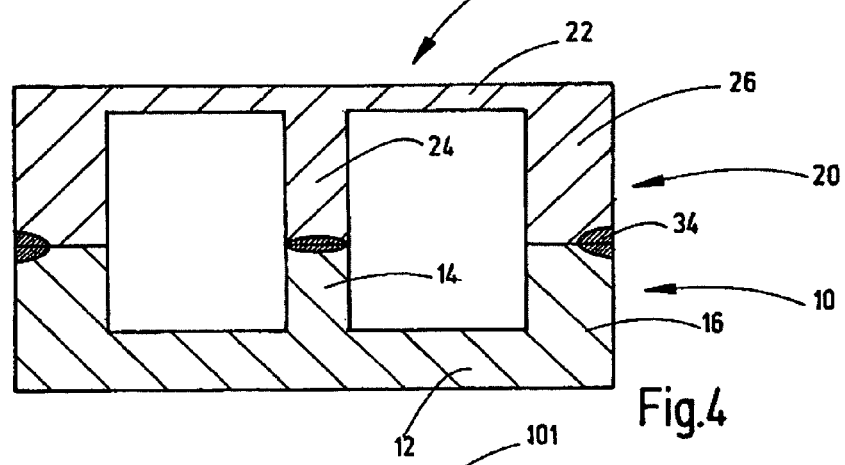

FIGS. 3 and 4 demonstrate two different stages in the production of a device 1 according to the invention. After the two deformation elements 10, 20 have been produced as separate parts, for example as turned parts, a spacer layer 46 is applied on the edge 16 of the first deformation element 10 and/or the edge 26 of the second deformation element 20. Subsequently, the two force transmitters 14, 24 are brought in contact against each other. For example, the second membrane 22 is deflected by a punch until the second force transmitter 24 is in contact against the first forte transmitter 14. Due to the different resistances to deflection of the two membranes 12, 22, essentially only the second membrane 22 is deflected. In the state represented in FIG. 3, the two force transmitters 14, 24 are connected to each other. If the connection is achieved by resistance welding, the spacer layer 46 is electrically insulating.

After creating the connection between the force transmitters 14, 24, the spacer layer 46 is removed. The result is the state as depicted in FIG. 4. Based on this, the edges 16, 26 of the two deformation elements 10, 20 can be connected to each other. For example, one possibility is a circumferential connecting seam 34 that is generated by electron beam welding.

The spacer layer 46 can be obtained, for example, by the masked application of a film or an oxide layer onto the edges 16, 26. The spacer layer 46 can be removed by a wet-chemical, for example by dissolving a film layer with a solvent or removing an oxide layer with an acid or a base.

Figure 5:
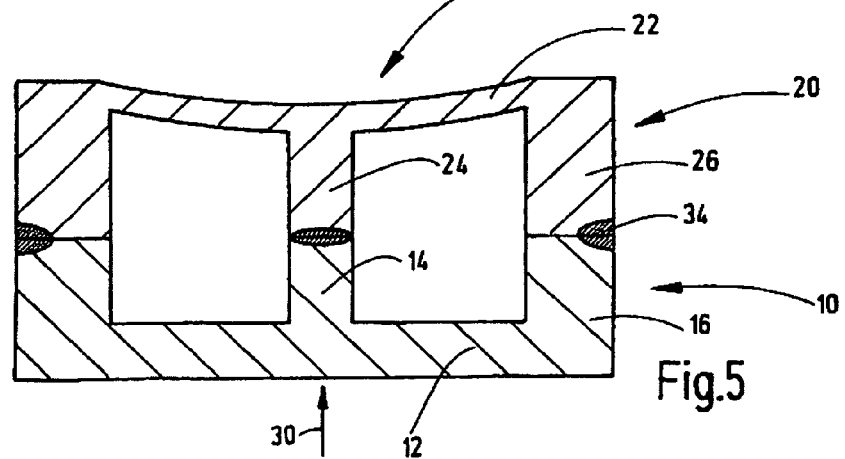
FIG. 5 is a side elevational view in section of the device according to a second exemplary embodiment of the invention.

FIG. 5 shows a cross-section of a second embodiment of a device 101, which provides for a preload or pre-deformation of the second membrane 23 even without the application of a force or a pressure 30. This can be provided, for example, by a non-flush length of at least one of the force transmitters 14, 24 in relation to the edge region 16, 26 of the respective deformation element 10, 20. Alternately or additionally, insertion parts can be incorporated, for example between the force transmitters 14, 24 and/or between the edges 16, 26 of the deformation elements 10, 20. If a force is applied in the direction of arrow 30 in FIG. 5, the membrane 22 is deflected from the represented concavely deflected position, first to the un-stressed flat position. Then, with further increasing force or pressure 30, it is arched into a convex shape. This way, the range of maximum linearity can be utilized between effective force 30 and deflection of the membrane 22, whereby the measuring precision of the device 101 is increased.

While various embodiments have been chosen to illustrate the invention, it will become understood by those skilled in the art that various changes and modifications can be made therein without departing from the scope of the invention as defined in the appended claims.

What is claimed is:

1. A method for producing a device for converting a force or a pressure into an electrical signal, comprising the steps of:
    forming a first deformation element receiving a force or pressure and having a first force transmitter in a center of the first deformation element;
    forming a second deformation element that is deflectable, that converts deflection thereof into an electrical signal and that has a second force transmitter in a center of the second deformation element; and
    welding the first force transmitter at an end thereof distant from the first deformation element to an end of the second force transmitter distant from the second deformation element by resistance welding such that the first and second force transmitters transmit both compressive and tensile forces from the first deformation element to the second deformation element.

2. A method according to claim 1 wherein
    the first and second deformation elements comprise first and second membranes, respectively.

3. A method according to claim 1 wherein
    edges of the first and second deformation elements are electrically insulated from each other when welding the ends of the first and second force transmitters.

4. A method according to claim 3 wherein
    an electrically insulating layer is applied to the edges of the first and second deformation elements directed toward each other prior to welding of the ends of the first and second force transmitters.

5. A method according to claim 1 wherein
    the edges of the first and second deformation elements are rigidly connected to each other subsequent to welding of the ends of the first and second force transmitters.

6. A method according to claim 5 wherein
    the edges of the first and second deformation elements are welded to each other.

\* \* \* \* \*